(12) United States Patent
Park

(10) Patent No.: US 6,571,050 B1
(45) Date of Patent: May 27, 2003

(54) METHOD AND APPARATUS FOR RECORDING/REPRODUCING VIDEO DATA USING MEMORY MANAGEMENT

(75) Inventor: Jae-Wan Park, Kyunggido (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/330,191

(22) Filed: Jun. 11, 1999

(30) Foreign Application Priority Data

Jun. 18, 1998 (KR) .............................................. 98-23794

(51) Int. Cl.⁷ .................................................. H04N 5/91
(52) U.S. Cl. ........................................ 386/46; 386/117
(58) Field of Search ............................ 386/46, 68, 124, 386/118, 117, 101; 360/5; 348/714–718, 159, 153; H04N 5/91

(56) References Cited

U.S. PATENT DOCUMENTS

| | | | | |
|---|---|---|---|---|
| 4,819,097 A | * | 4/1989 | Azuma et al. | 386/101 |
| 5,019,905 A | * | 5/1991 | Pshtissky et al. | 348/159 |
| 5,153,730 A | * | 10/1992 | Nagasaki et al. | 348/231.6 |
| 5,200,863 A | * | 4/1993 | Orii | 386/118 |
| 5,367,332 A | * | 11/1994 | Kerns et al. | 348/231.1 |
| 5,999,690 A | * | 12/1999 | Ro | 386/46 |

FOREIGN PATENT DOCUMENTS

| | | |
|---|---|---|
| JP | 4047550 | 2/1992 |
| JP | 7336641 | 12/1995 |

* cited by examiner

Primary Examiner—Vincent Boccio
(74) Attorney, Agent, or Firm—Birch, Stewart, Kolasch & Birch, LLP

(57) ABSTRACT

In a recording operation, video data is written to a single port memory at a periodic interval, and the video data is read from the memory between points in time when the video data is written. The read video data is recorded on a recording medium. During a reproducing operation, reproduced video data is written in the single port memory, and the reproduced video data is read from the memory at a periodic interval. Further reproduced video data is written to the memory between points in time when the reproduced video data is read. In backward reproduction, reproduced video data is read in an order opposite to that in which it was written.

21 Claims, 6 Drawing Sheets

METHOD AND APPARATUS FOR RECORDING/REPRODUCING VIDEO DATA USING MEMORY MANAGEMENT

BACKGROUND OF THE INVENTION

1. Field of the Invention

The present invention relates to a method and apparatus for recording/reproducing video data using a memory; and more particularly, managing use of the memory.

2. Brief Description of the Prior Art

Unlike ordinary continuous video cassette recorders which record every frame of video signals, some video cassette recorders such as an intermittent video recording/reproducing apparatus (e.g., a time-lapse video cassette recorder (VCR)) intermittently record frames of a real video signal. For example, a time-lapse VCR receives video signals from several video cameras or the like, and intermittently records frames of the video signal on a magnetic tape at a pre-selected regular interval. As a result, the recorder drives a loaded tape to run and stop repeatedly. These time-lapse VCRs have been used in various areas requiring long recording times such as security monitoring systems in banks and museums.

As shown in FIG. 1, the conventional time-lapse video cassette recorder comprises a video decoder 100 which extracts a luminance signal (Y) and chrominance signal (C) from the composite analog video signals from external cameras and converts them into the digital video signals respectively; a video compressor 200 which compresses the converted digital video signals; a memory 300 in which the compressed video data are stored sequentially; a data compressor 400 which decompresses the digital video data read out from the memory 300; a bus 902 which allows communication between the compressor 200, the memory 300, and the de-compressor 400; a video encoder 500 which reconverts the decompressed digital video signals into the luminance signal and chrominance signal and synthesizes these signals into a composite analog video signal; a digital signal processor (DSP) 600 for processing digital signals in the course of compression, decompression, and memory reading/writing operations; a recording/reproducing unit 800 which records the reconverted composite analog video signals on a storage media such a magnetic tape and reproduces the recorded video signals from the storage media; and a controller 700 which supervises the aforementioned overall functions.

Furthermore, as shown in FIG. 1, the recording/reproducing unit 800 comprises a reproducing unit 810 which reproduces the signals modulated for recording on the magnetic tape; a deck 820 which drives mechanical elements and runs the magnetic tape forward or backward; and a recording unit 830 which records the composite analog video signals on the magnetic tape.

In addition, two switches designated SW1 and SW2 are shown in FIG. 1 and they change their signal path depending upon the mode set by the controller 700.

As shown in FIG. 2, the memory 300 comprises a buffer memory 310, which stores the compressed video data temporarily, and a frame memory 320, which sequentially receives the video data stored temporarily in the buffer memory 310, stores the video data, and then sends the video data to the decompressor 400 via the buffer memory 310 and the bus 902 when the number of frames of video signals sequentially stored in the frame memory 320 equals its maximum storage capacity.

The method for reproducing the intermittently recorded video signals with the time-lapse video cassette recorder configured as above is explained below in detail with reference to FIGS. 1 and 2. When a user inputs a time-lapse mode reproduction command, the controller 700 drives the deck 820 to pull out a tape into a loading state. After the tape is loaded, the deck 820 runs the magnetic tape at normal speed, which means to travel forward a frame-distance in one second, while the reproducing unit 810 reproduces the video signals recorded on the tape. In this case, the distance the magnetic tape is moved for reproducing depends on the storage capacity of the memory 300.

The video decoder 100 separates the reproduced composite analog video signal into the luminance component signal (Y) and the chrominance component signal (U, V). The separated component signals are sampled, converted into digital data streams, and then sent to the video compressor 200.

Under the control of the DSP 600, each of video signals converted into a digital data stream is processed according to a predetermined compression algorithm by the video compressor 200. The compressed digital data streams are stored sequentially in the frame memory 320 on a frame-by-frame basis via the buffer memory 310.

When the number of frames sequentially stored in the field memory 320 reaches the maximum storage capacity of the memory 320, the digital video signals stored in the frame memory 320 are read frame-by-frame, under the control of the DSP 600 as controlled by the controller 700, at a regular interval according to the time lapse mode present by the user. The digital video signals read out are decompressed and restored to their original size, and then transmitted to the encoder 500 by the decompressor 400.

Furthermore, the controller 700 controls the video encoder 500 to synthesize the luminance and chrominance component signals of the decompressed digital video streams into a composite analog video signal, which is the same as the composite video signal received from an external video camera. At the same time, the controller 700 controls the switch SW2 to change the signal path from recording connection to reproducing connection, therefore the exterior monitor displays the video signals at the regular interval.

On the other hand, when the amount of data to be read in the frame memory 320 becomes less than or equal to a predetermined threshold value in the course of reading data from the frame memory 320, the controller 700 controls the recording/reproducing unit 800 to start reproducing the recorded signal next to the signal last reproduced. The video data streams converted from this newly reproduced signal are buffered in the buffer memory 310. When the reading of data stored in the frame memory 320 is complete, the data stream buffered in the buffer memory 310 is transmitted into the frame memory 320 and is read out again. As long as the buffer memory 310 is large enough, the above explained method makes it possible to eliminate the delay time which could occur between successive reproducing steps.

Furthermore, the video cassette recorder configured as above can accomplish backward reproducing of the recorded video signals through almost the same procedure. The backward reproduction (i.e., replay in reverse) process further includes the following steps. The controller 700 drives the deck 820 to move the tape in reverse at first. After backward movement, the tape is driven to move forward while the recorded signal is reproduced and stored in the memory 300. These steps are then repeated with each rewinding of the tape positioning the tape so the next set of reproduced frames are earlier in time than the previously reproduced set of frames. In backward reproduction, the tape cannot be reproduced while driven in reverse and produce digital video data representing replay in reverse.

In the case of intermittent recording of the video signals received from the external cameras using the time-lapse video cassette recorder configured as in FIG. 1, the video signals being received are buffered in real time in the buffer memory 310, and the buffered video signals are intermittently selected at a specific interval in units of a frame, and then transferred into the frame memory 320. When the amount of frames sequentially stored in the frame memory 320 reaches a maximum storage capacity of the frame memory 320, the controller 700 controls the DSP 600 to output the stored video signal consisting of luminance and chrominance components to the video encoder 500, and to cause the video encoder 500 to synthesize the two signal components into the composite analog video signal. The reading/reproducing unit 800 records the synthesized composite video signals while driving the tape forward.

The video signals received in the recording mode are temporarily stored in the buffer memory 310, and the buffer memory 310 becomes full when 150 frames of video signals are stored. At the same time that the buffer memory 310 becomes full, the recording of 150 frames in the frame memory 320 is completed. Then, the buffered video signals are selected intermittently every several frames, and the selected frames are transferred into the frame memory 320 again.

Unlike the forward and backward reproducing mode, in the recording mode the video signals are stored in the frame memory 320 intermittently, read continuously in real time and then recorded on the magnetic tape. While the video signals are being recorded, the video signals received from the external video cameras are stored in the buffer memory 310 temporarily.

However, with the time-lapse video cassette recorder containing the memory configured as above, the recording and reproducing method has a high cost because two memories 310 and 320 are used for buffering the video signal, and the frame memory 320, which can store video signals frame-by-frame, is expensive.

Furthermore, in the case of the time-lapse video cassette recorder containing the memory configured as above, if the amount of data to be read becomes less than or equal to the preset threshold value in forward or backward reproduction of the video data written in the frame memory 320, then (1) the reproducing unit 810 should reproduce the video signals next to the video data stored in the frame memory 320 and (2) the reproduced video should be stored in the buffer memory 310 in advance to display the reproduced video image with no delay. Therefore, in the event that the preset threshold value requires a small amount of data to be read (D1 in FIG. 3A) before starting the next reproduction as shown in FIG. 3A and if the user reduces the display time interval between frames, from, for example, 72 hours mode (=36/30 sec) to 36 hours mode(=18/30 sec), the time required to reproduce the remaining data is cut in half. Such a change might cause the reproduction of the video signals stored in the frame memory 320 to complete before the next amount of video data has been reproduced and stored in the buffer memory 310. The above explained method has a problem in that reproduction may be delayed till the next amount of video data is reproduced and buffered in the buffer memory 310.

In addition, in contrast to the above case, if the preset threshold value causes the next reproduction to start when there remains a large amount of data to be read, the above method does not suffer the time delay problem. However, if the user changes between forward and backward reproduction frequently, the deck 820 overruns. This overrunning problem will be described with respect to FIG. 3B.

Referring to FIG. 3B if the amount of data to be reproduced is less than or equal to the preset threshold value D2 during the first forward reproduction, then the controller 700 controls the deck 820 to reproduce the next video signals and the video signals reproduced by the reproducing unit 810 are stored in the buffer memory 310. In this case, if the user inputs a backward reproduction command before the forward reproduction is completed as shown in FIG. 3B then the controller 700 begins to control the deck 820 for backward reproduction. As in the forward reproduction, if the amount of data to be reproduced is less than or equal to the preset value D2 during the backward reproduction, then the controller 700 controls the deck 820 to reproduce the next video signals, which have been reproduced just before, and the reproduced video signals are temporarily stored in the buffer memory 310.

Therefore, when a user alternates between a forward and a backward reproduction mode, if the interval (T) during which the deck 820 does reproduce and buffer the next video signals is short, as shown in FIG. 3B, then the deck 820 must drive to change the rotation force of the capstan motor, run the magnetic tape and stop it repeatedly. Thus, the conventional method explained above has the problem that the deck 820 overruns. As a result, the life of the capstan motor is significantly decreased.

SUMMARY OF THE INVENTION

The reading of video data from and the writing of video data to a memory of the recording/reproducing apparatus are controlled by a controller to prevent interference between the read and write operations. When recording video data, the video data is written to the memory at a periodic interval, and the video data is read from the memory between the points in time when the video data is written. The read video data is then recorded on a recording medium When video data is reproduced, the reproduced video data is written to the memory. Reading of the reproduced video data from the memory occurs at a periodic interval. Between points in time when the reproduced data is read, further reproduced video data is written to the memory. In a backward reproduction mode, the video data is read in an order opposite to the order in which the reproduced video data was written.

Through memory management as discussed above, an address conflict between the reading and writing of video data does not occur. Furthermore, because of the memory management, a single port memory can be used. A single port memory costs significantly less than a dual port memory or multiple dual port memories and a frame memory.

BRIEF DESCRIPTION OF THE DRAWINGS

The accompanying drawings, which are included to provide a further understanding of the invention, illustrate a preferred embodiment of this invention, and together with the description, serve to explain the principles of the present invention.

In the drawings.

DETAILED DESCRIPTION OF THE PREFERRED EMBODIMENTS

Figure 1:
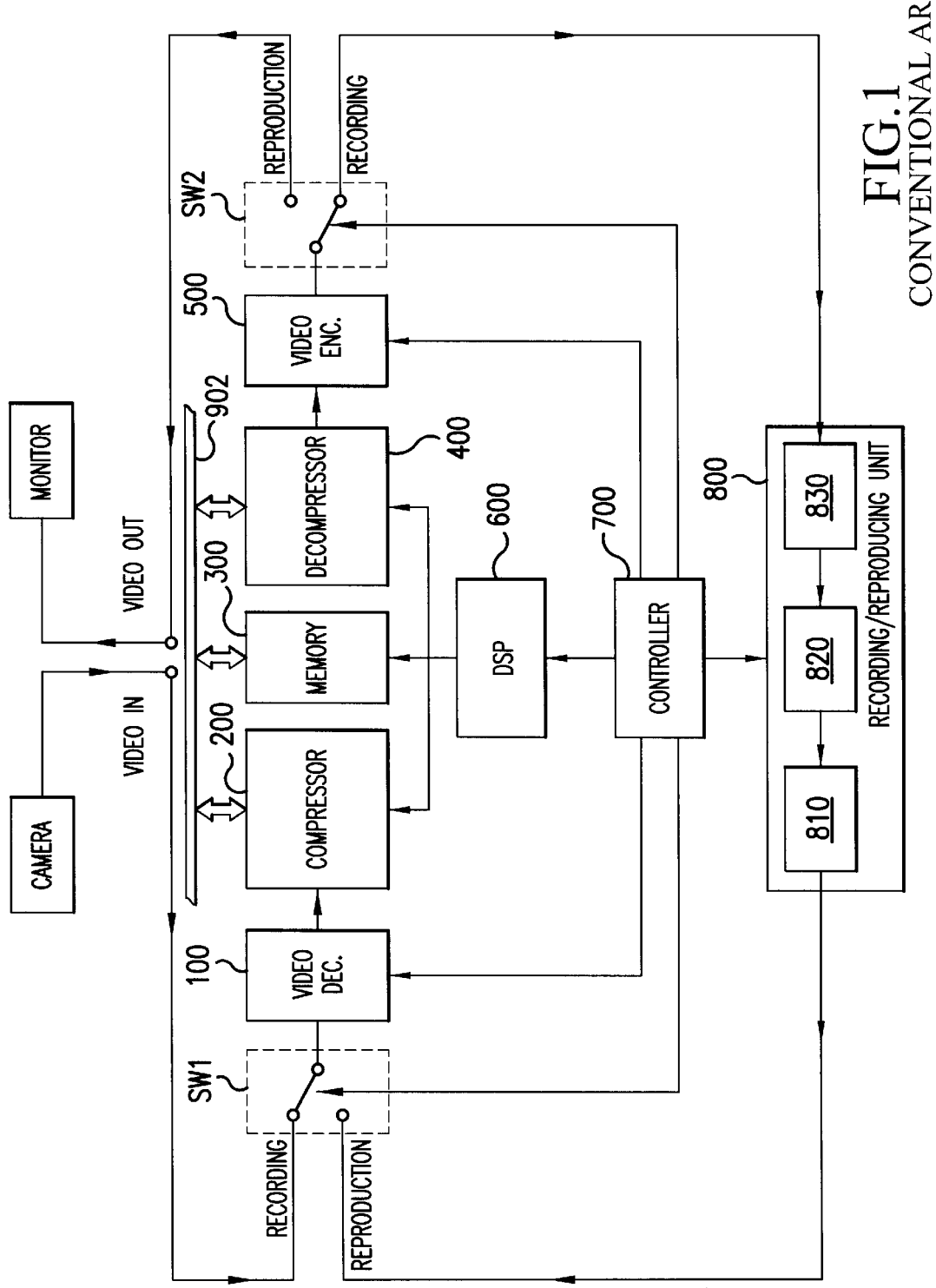
FIG. 1 is a schematic block diagram of a convention time-lapse video cassette recorder with a memory buffering video signal.
Figure 2:
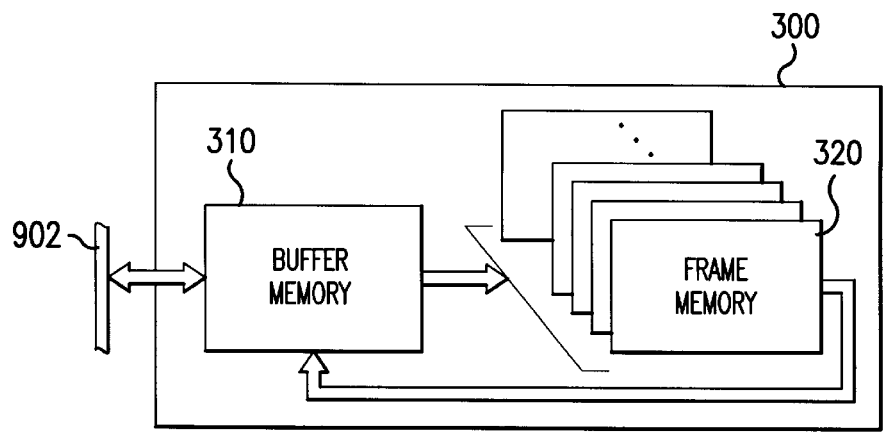
FIG. 2 is a detailed block diagram of the memory shown in FIG. 1.
Figure 3A:
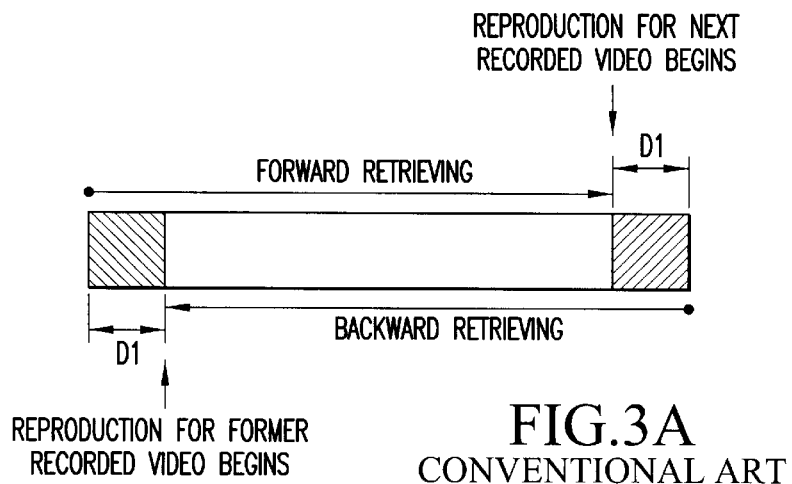
FIGS. 3A and 3B show the two undesirable cases schematically in conventional allocation and usage of the memory of FIG. 2.
Figure 3B:
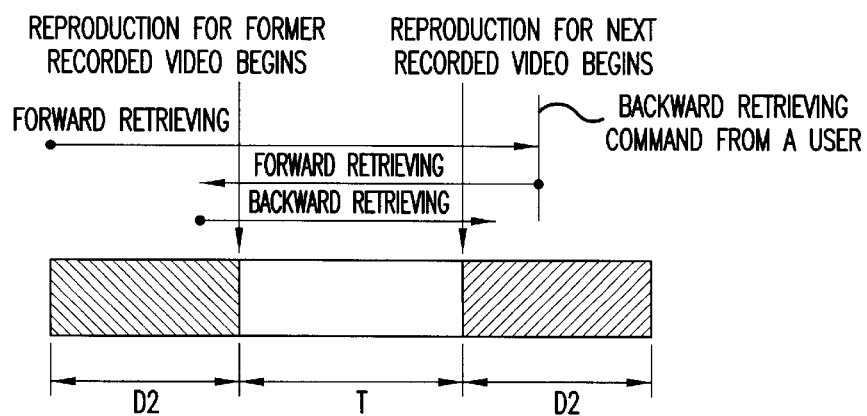

The method according to the present invention will be described as implemental on the time-lapse video cassette recorder (VCR) illustrated in FIG. 9. The time-lapse VCR of FIG. 9 has the same structure as the time-lapse VCR of FIG. 1 except that (1) the memory 300 in FIG. 1 has been replaced by a single port RAM 900 and (2) the single port RAM 900, the compressor 200 and the decompressor 400 communicate via a bus 902. Accordingly, only the operational differences between FIG. 1 and FIG. 9 will be described. The operation of the present invention will be described with respect to FIGS. 4A–8.

First, operation according to the present invention in the recording mode will be described.

The real time composite analog video signals sent from, for example, at least one external camera such as a Closed Circuit-TV (CCTV) and so forth are input to the video decoder 100. In the recording mode, the decoder 100 intermittently selects a video frame from the video signal at a preset regular interval calculated based on the total recording time for a normal time-length tape as set in advance by a user.

In addition, the decoder 100 extracts luminance and chrominance component signals from the selected composite analog video signal, converts them into digital data streams, and then sends the converted digital video signals to the video compressor 200.

Under the control of the DSP 600, the compressor 200 processes the luminance and chrominance data converted into digital by applying, for example, the Wavelet algorithm to each of the signal components. It should be noted, however, that the compression algorithm is not limited to the Wavelet algorithm, and any suitable digital video data compression algorithm can be used. As a result, the digital video data are reduced in data size at various rates based on the characteristic of the signal and then the reduced data are placed on the bus 902 and stored in the RAM 900 on a frame-by-frame basis.

The RAM 900 is divided into two banks A and B, each of which can store 75 frames of video data, respectively. The video data streams are stored in bank A at first and then bank B, sequentially. The full video data stored intermittently in the RAM 900, which have been compressed according to the above procedures, correspond to about five seconds of video during normal recording/reproducing.

Figure 4A:
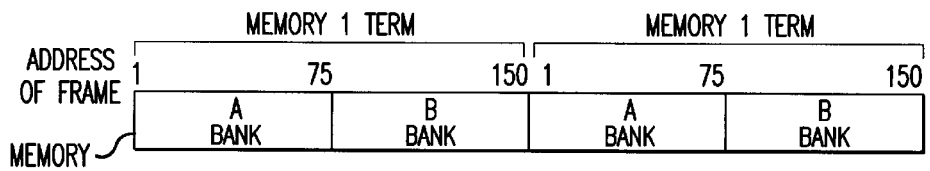
FIGS. 4A–4B illustrate schematically the recording method adopted in a time-lapse video cassette recorder according to the present invention.

While the RAM 900 is storing the video data in bank A, the deck 820 is in a pause period shown as ① in FIG. 4A. Once the maximum video data, which is 75 frames in this embodiment, has been stored in bank A, the controller 700 memorizes the identification (ID) number of the last stored video frame in bank A. The RAM 900 then begins storing the video data in bank B. As shown in greater detail in FIG. 4B, the video data is written in the RAM 900 at an interval dependent on the intermittent recording interval set by the user. As such, writing to the single port RAM 900 occurs periodically. Also, the actual time taken to write the video data in the RAM 900 is extremely short (e.g., a clock frequency of 27 MHz).

When the RAM 900 begins storing video data in bank B, the controller 700 controls the deck 820 to run the magnetic tape a predetermined distance backward and then to run it forward again in the period ② of FIG. 4A. This operation is called the assemble mode. The assemble mode allows the controller 700 to accurately find the position at which the next recording should start by comparing the previously memorized ID with one superimposed in the video frame being reproduced from the reproducing unit 810. The assemble mode also allows the tape speed to reach a proper speed for recording.

Figure 4B:
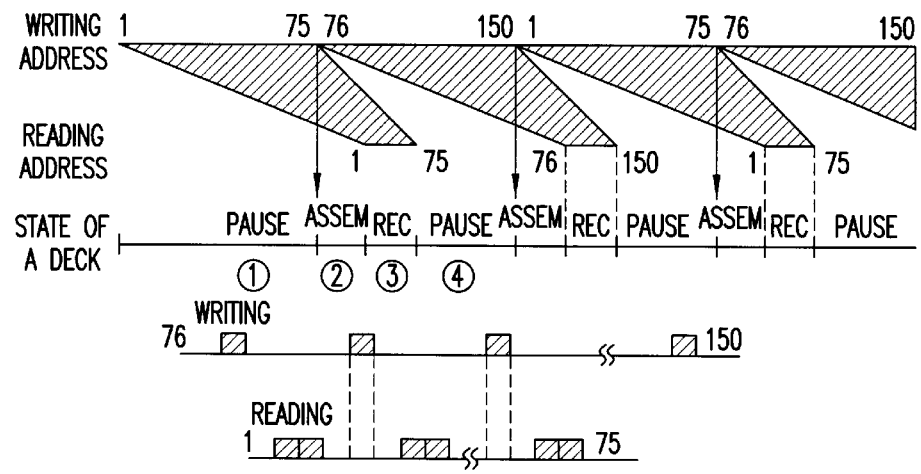

When the accurate position to record the next intermittent video signal is found, and after the tape speed has reached normal speed in the assemble mode, the controller 700 controls the deck 820 to enter a recording period ③ shown in FIG. 4A. Under the control of the controller 700, the DSP 600 controls the compressor 200, the RAM 900 and the decompressor 400 to alternately write and read video data to and from the RAM 900. Namely, as shown in FIG. 4B, reading of video data from bank A in the RAM 900 takes place between the periods of time during which writing to the RAM 900 occurs. When the DSP 600 sets the RAM 900 to write, the DSP 600 causes the decompressor 200 to output the video data, for storage in bank B, to the bus 900 and causes the decompressor 400 to ignore the video data on the bus 902. When the DSP 600 sets the RAM 900 to read, the DSP 600 causes the decompressor 200 to stop outputting data to the bus 902, causes the RAM 900 to sequentially output the video data stored in bank A to the bus 902, and causes the decompressor 400 to decompress the video data on the bus 902. The decompressor 400 decompresses the video data to a size equal to the size of the video data prior to compression.

Furthermore, the controller 700 controls the video encoder 500 to convert the luminance and chrominance components of the decompressed digital video data into the analog video signals respectively and to mix the two converted components into a composite analog video signal. As a result, the composite analog video signal becomes equal to the input composite analog video signal. At this time, the controller 700 controls the recording/reproducing unit 800 to record the signals from the encoder 500 from the accurate recording position, which is adjacent to the video signal recorded during the prior recording period.

As shown in FIGS. 4A and 4B, the video data is completely read from bank A of the RAM 900 before the writing of video data to bank B of the RAM 900 is completed. When the 75 frames of the video data intermittently selected and stored in bank A are recorded completely, the controller 700 controls the deck 820 to enter the pause period ④ of FIG. 4A until the next assemble mode begins. During the pause period, writing of video data into the bank B continues as shown in FIG. 4A.

As discussed above, while the stored data in the bank A are read out and recorded, the controller 700 controls the DSP 600 to effect a switching operation such that video signals received from the external camera are decoded, compressed and intermittently, but sequentially, stored in the bank B after appropriate signal processing. When the bank B becomes full after the data in bank A has been read and recorded, the above procedures are repeated to read and record the data stored in bank B while video data is written in bank A. These procedures repeat until recording stop is requested from a user.

Since the reading of the stored data from the RAM 900 and the intermittent storing of data in the RAM 900 are accomplished in different memory banks, the writing and the reading addresses are always pointing to a different bank of memory. Therefore, an address conflict problem cannot arise even though the reading and the storing steps are conducted substantially simultaneously through the switching operation. Furthermore, because of the switching operation, a single port RAM 900 is used to store the video data. A single port RAM 900 costs significantly less than a dual port RAM or multiple dual port memories and a frame memory.

The description of the memory allocation process performed during forward reproduction will now be described.

First, the RAM 900, which can store a total 150 frames of video data, are equally divided into three banks A, B, and C, so that each bank stores 50 frames of video data.

Figure 5A:
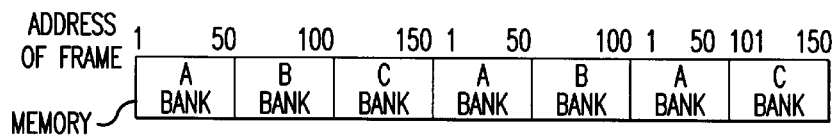
FIGS. 5A–5B illustrate schematically the forward reproducing method adopted in a time-lapse video cassette recorder according to the present invention.

If the user inputs the forward reproduction command, then the controller 700 causes the deck 820 to change from an unloaded state to a loaded state, and to run the recording tape forward at a normal travelling speed(=30 frames/sec) within the period (a) of FIG. 5A while the reproducing unit 810 reproduces the video signals recorded on the magnetic tape. At this time, the controller 700 controls the switches SW1 and SW2 to change the signal path from recording to reproducing so that the reproduced video signals are transmitted to the video decoder 100, compressed by the compressor 200 and written in the RAM 900, while video data read from the RAM 900 is decompressed by the decompressor 400, encoded by the encoder 500 and output to the monitor by the second switch SW2.

In the forward reproducing mode the video decoder 100 separates the reproduced composite video signals into the luminance and chrominance component signals and converts the luminance and chrominance composite signals into digital data streams.

To reduce the size of a signal component, the converted digital video signals are compressed in the video compressor 200 according to, for example, the well-known Wavelet algorithm, which is described below in detail.

Figure 6:
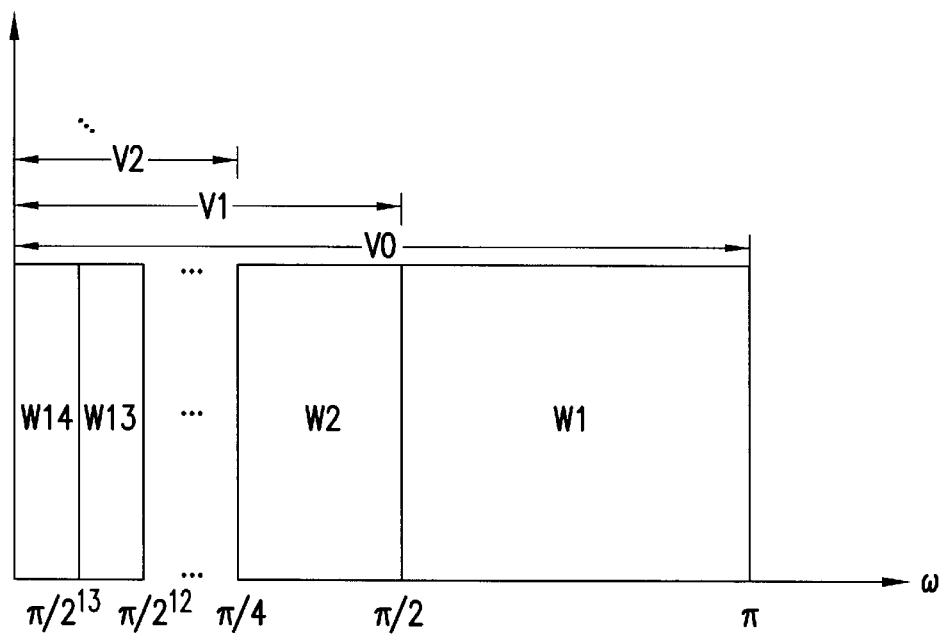
FIG. 6 illustrates the divided spectrum bands by applying the Wavelet algorithm to a video signal.

As shown in FIG. 6, the whole spectrum bank (V0) of the input luminance signal data in which all frequencies are distributed is encoded into sub-bands so that it is divided into two bands by the central frequency of band (V0). The low frequency band (V1) of the divided bands is encoded into two bands by the central frequency of sub-band (V1), and this procedure is repeated several times. After that, the block data corresponding to the separated spectrum bands (W1, W2, W3, . . . , W14) are compressed.

On the other hand, the controller 700 instructs the DSP 600 to compare the video signals with the preceding video signals. Responding to the instruction of the controller 700, the DSP 600 compares every cell value of luminance data (NTSC: 300 bytes, PAL: 432 bytes) in the lowest frequency band (W14) of the luminance data, which has been compressed to about 5 Kbytes, with the corresponding cell value of the lowest band data of the preceding video signal, calculates the variance of the difference between the two cell values for the lowest band and then sends the variance value to the controller 700.

The controller 700 might compare this calculated variance received from the DSP 600 with a preset threshold value to determine the identity between the two consecutive video signals. When the identity is confirmed, that is, the obtained variance does not exceed the preset threshold, only the general information including the camera ID number, the signal receiving time, etc. may be stored in a separate region in connection with correspondent luminance signal.

Figure 5B:
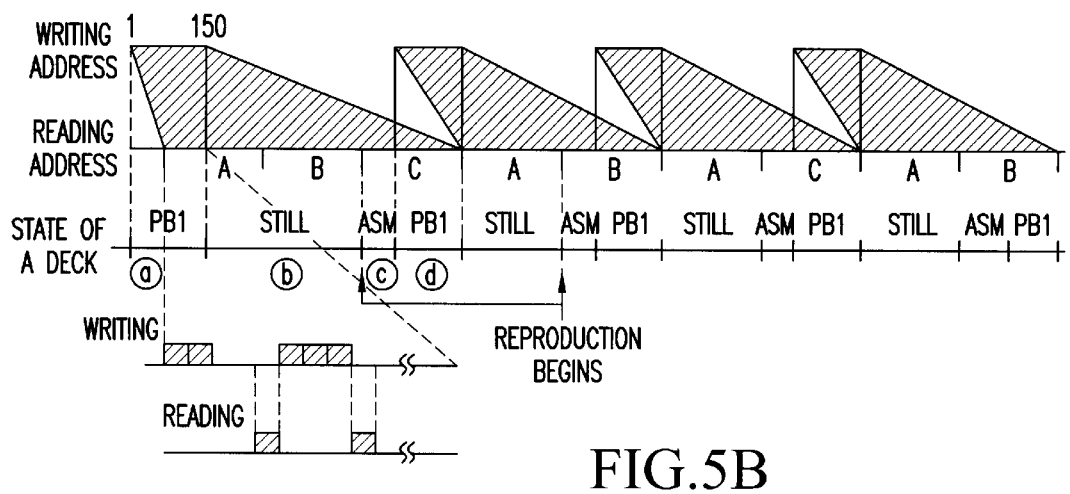

After bank A has been filled with video data, the controller 700 instructs the DSP 600 to control the compressor 200, the RAM 900 and the decompressor 400 in a switching mode. The DSP 600 controls the compressor 200, the RAM 900 and the decompressor 400 in the same manner as discussed above with respect to the switching mode of FIGS. 4A–4B except that, as shown in FIG. 5B, (1) video data is read for short periods of time at an interval dependent on the total recording time set by the user and (2) video data is written between reading operations. As shown in FIGS. 5A and 5B, the RAM 900 is completely filled (i.e., video data fills banks A, B and C) before the reading of bank A is complete.

When the RAM 900 is filled with data up to its storage capacity (total 150 frames which correspond to 5 seconds of normal reproduction) or, in other words, when all the banks (banks A, B, and C) of the PAM 900 are full of data, the controller 700 controls the deck 820 to enter the still mode, which corresponds to interval (b) in FIG. 5A. In the still mode, the DSP 600 reads out the video data stored in the RAM 900, frame-by-frame at a constant predetermined interval based on the total recording time set by a user.

The read video data are converted to composite video signals through the data decompressing and decoding performed by the decompressor 400 and the encoder 500.

When the deck 820 enters the still mode, the ID of the last video frame is memorized so that the accurate position, adjacent to the video signal previously reproduced, can be searched during subsequent reproduction, and the magnetic tape is driven backward by about 30 frames. The tape is moved backward to provide sufficient time for the tape to reach a normal velocity and allow detection of the accurate position for the next recorded video frames.

In the course of the sequential reading from the RAM 900, if the retrieving of the data in banks A and B is completed and the retrieving of the data in bank C begins, then the controller 700 controls the deck 820 to enter an assemble mode, which is a reproduction stand-by state and is shown in the period (c) of FIG. 5. In the-assemble mode, as with the previously described assemble modes, a field match operation is performed so that the falling edge of a head switching signal (30 Hz) and the starting point of an odd field of video to be recorded coincide in-phase. Specifically, the phase of control pulses to be recorded are controlled to coincide with previously recorded control pulses, and a position identification (ID) searching operation is performed to locate the point of the last reproduced frame. This latter operation is performed by comparing an ID in the reproduced video signal with the memorized ID.

In assemble mode, the controller 700 controls the deck 820 to drive the magnetic tape so that a normal reproduction speed is reached. After the assemble mode, the recorded video signal, after the accurate position, is sequentially and temporarily stored in the RAM 900 upon being reproduced by the reproducing unit 810. This reproducing period is shown as (d) in FIG. 5. However, unlike the initial reproduction of 150 frames of video signal, 100 frames are reproduced and stored sequentially in banks A and B in the switching mode while the reading of video data from bank C completes.

Retrieving video signals stored in the bank C is completed at substantially the same time that the newly reproduced video signals have been stored in banks A and B. At this point in time, the controller 700 commands the deck 820 to enter the still mode again. Therefore, the reproducing and storing operations stop, and the video data stored in the banks A and B are read. The DSP 600 causes the decompressor 400 and video encoder 500 to process the read video data in banks A and B so that a composite video signal is generated. During this second reproducing operation, when reading of the video data stored in the bank B begins, the controller 700 causes operation in the assemble and reproducing modes to repeat. However, in this reproducing mode, video signals of only 100 frames are reproduced and stored sequentially in banks A and C in the switching mode while the reading of video data from bank B completes.

As with the previous reproducing mode, reproduction and storage of video signals in banks A and C completes at the same time reading of video data from bank B completes. Reading of data from banks A and C then commences, and the cycle begins again. Namely, data will be alternately written to and read from (1) banks A and B and (2) banks A and C. Since the reading and writing operations are conducted in separate memory space, the reading and the writing addresses never conflict even though the reading of stored video data and the storing of newly reproduced video signals are conducted substantially simultaneously through operation in the switching mode. As shown in FIG. 5, video data is continuously read from the RAM 900, even though video data is only intermittently written thereto. As a result, a video signal is continuously output for display.

The method for allocating and using the memory in backward reproducing the video signals by the time-lapse video cassette recorder according to the present invention will be explained below with reference to FIGS. 7–9.

Because the video signals to be reproduced are converted to digital and then stored in the RAM 900 in the backward reproducing, the magnetic tape must be run forward to reproduce the recorded signal. Then, the stored signal must be read in reverse so that images are displayed in reverse.

Figure 7:
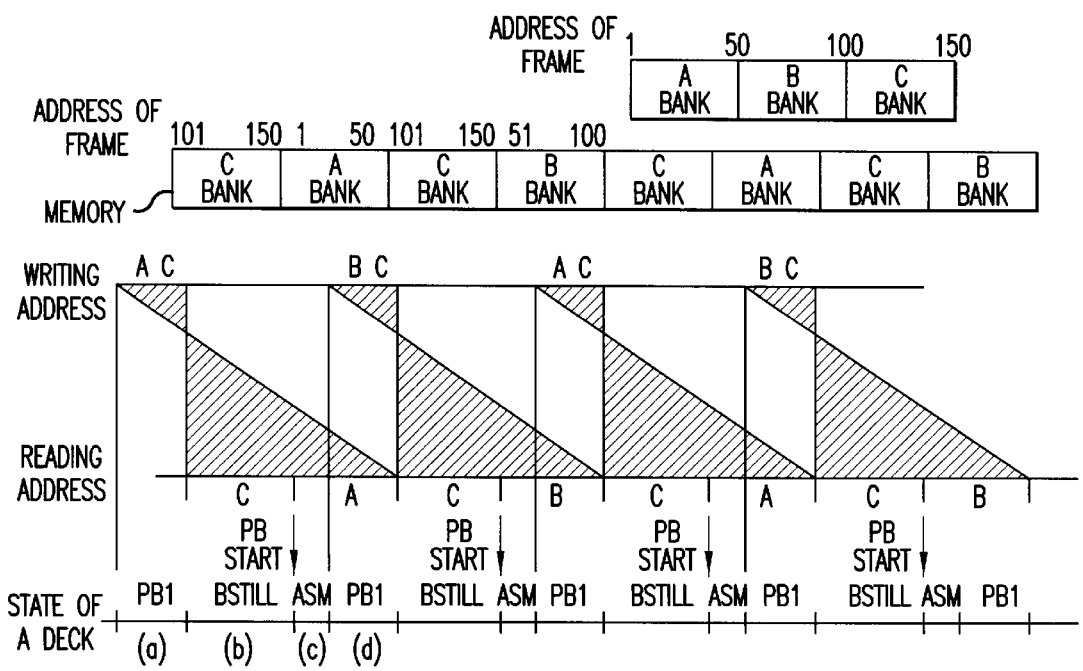
FIG. 7 illustrates schematically the backward reproducing method adopted in a time-lapse video cassette recorder according to the present invention.

Thus, if the user inputs the backward reproduction command, the controller 700, as in forward reproducing mode, forces the deck 820 to change from the unloaded stated to the loaded state and to run the tape at normal travelling velocity within the period (a) in FIG. 7. During this period, the reproducing unit 810 reproduces video signals recorded on the magnetic tape. At this time, the controller 700 controls the switches SW1 and SW2 to form the reproduction signal path so that the reproduced video signals are sent to the video decoder 100. The video decoder 100 separates the input composite video signals into the luminance component signals without signal intermittent selection and the chrominance component signals, and samples them respectively, so that each of the video signal components is converted into a digital data stream. To reduce the size of data, the converted digital video signals are compressed by the video compressor 200 according to the Wavelet theory which has been explained in detail hereinbefore.

In the backward reproduction mode, the RAM 900 has been divided into three banks A, B and C as in the forward reproduction mode. Each bank can store 50 frames. The video signals are sequentially stored in two banks, for example, first bank A and then bank C.

When the temporary,storing of the video signals in the RAM 900 is completed, the controller 700 commands the decompressor 400 to retrieve the video signals frame-by-frame at a constant predetermined interval based on the total recording time set by a user and in the opposite or reverse order that the video data was stored. Accordingly, the video data is read from bank C and then bank A.

During the backward reproducing of video signals, the controller 700 memorizes the ID of the last stored video frame so that the accurate position, adjacent to the first frame of video signals previously reproduced, can be searched in later reproducing. In addition, referring to FIG. 8, the controller 700 controls the deck 820 to drive the magnetic tape backwards by more than 200 frames, for example, about 230 frames after video data has been stored in banks A and C. This is referred to as the backward still mode. The 100 frames within about 230 frames traveled backward have been reproduced just before in period (a).

During the sequential reverse reading of video data from the RAM 900, if the retrieving of the data in bank C is completed and the retrieving of the data from bank A begins, then the controller 700 controls the deck 820 to enter the assemble mode as previously described with respect to FIGS. 4 and 5. The assemble mode corresponds to period (c) in FIGS. 7 and 8.

Figure 8:
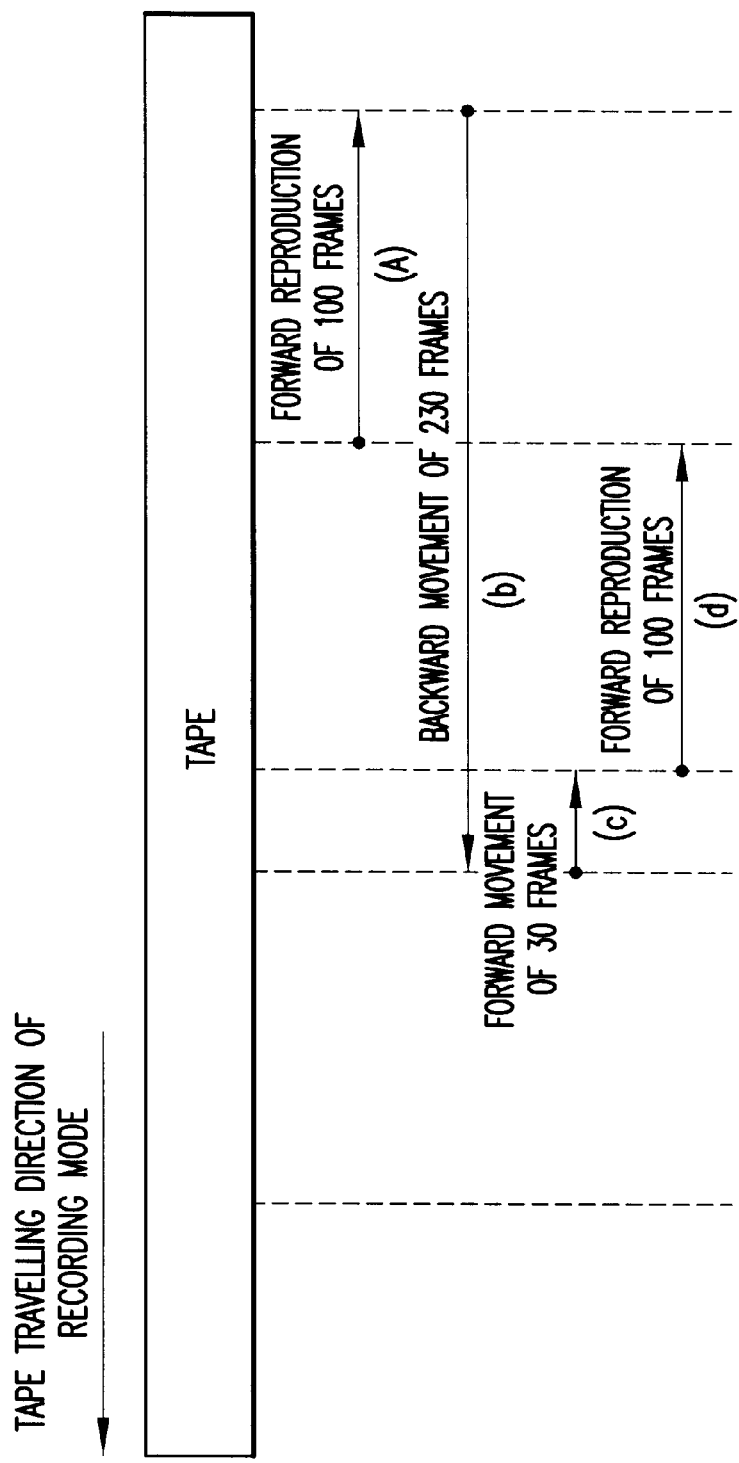
FIG. 8 illustrates schematically the running direction of the magnetic tape in backward reproduction.
Figure 9:
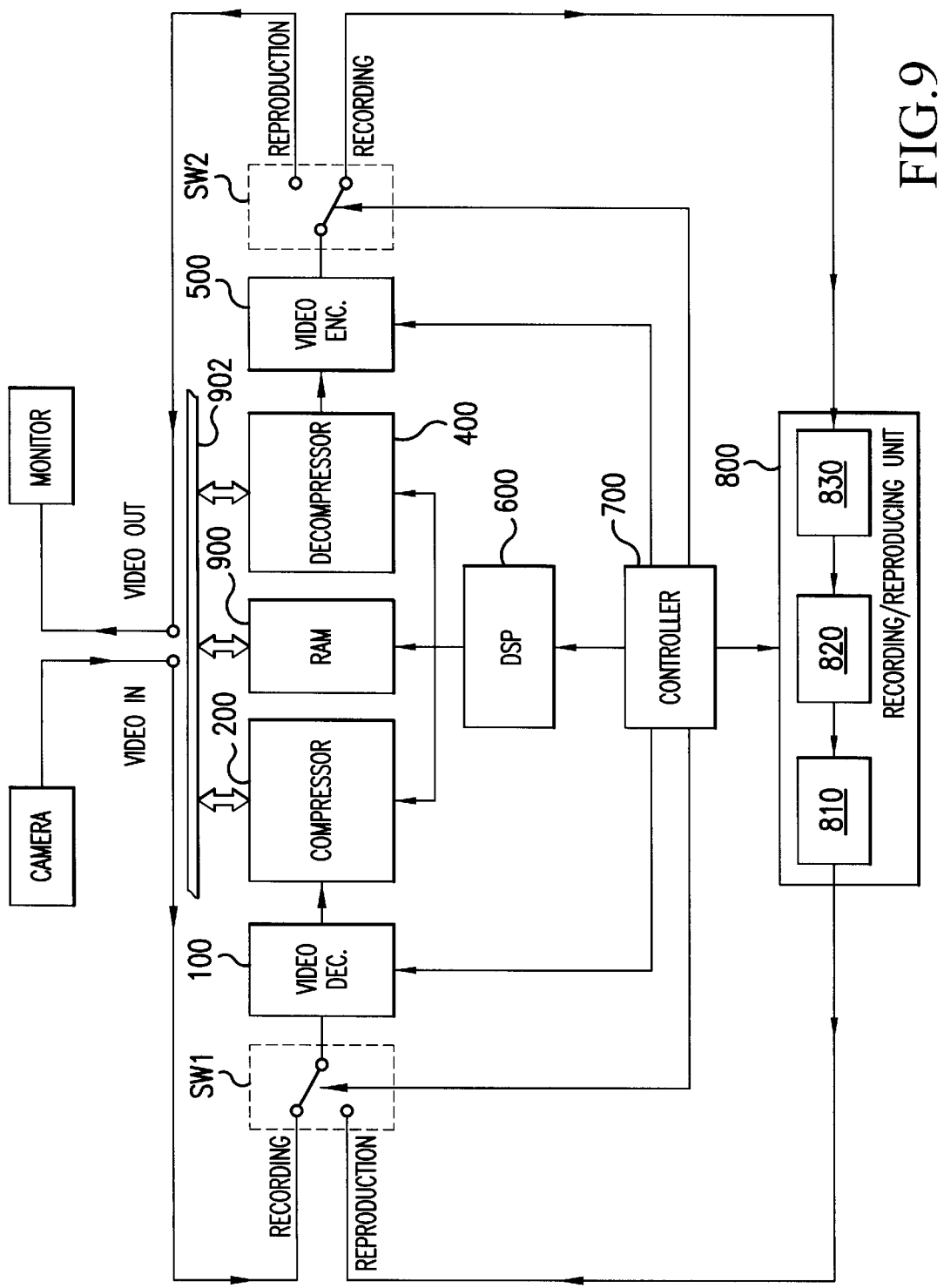
FIG. 9 illustrates a schematic block diagram of a time-lapse video cassette recorder according to the present invention.

After the assemble mode, the controller 700 controls the deck 820 to drive the magnetic tape to travel forward in the 10 period (d) in FIGS. 7 and 8, while searching for the reproducing position of the video signal. The reproducing position ID is different from the memorized ID by exactly 200 frames. The recorded video signal following the reproducing position is sequentially and temporarily stored in the RAM 900 after being reproduced by the reproducing unit 810. At this time, the video signals of only 100 frames are reproduced and stored sequentially in banks B and C. This storing operation occurs while video data is being read from bank A.

Namely, the controller 700 instructs the DSP 600 to control the compressor 200, the RAM 900 and the decompressor 400 in the switching mode. The DSP 600 controls the compressor 200, the RAM 900 and the decompressor 400 in the same manner as discussed above with respect to the switching mode of FIGS. 5A–5B. As shown in FIG. 7, the banks B and C of the RAM 900 are completely filled when the reading of bank A is complete. Furthermore, the reading operation takes place at a constant predetermined interval based on the total recording time set by a user.

Retrieving video signals stored in the bank A is complete at substantially the same time that the newly reproduced video signals have been stored in banks B and C. At this point in time, the controller 700 commands the deck 820 to enter the backward still mode again. During the backward still mode, the DSP 600 causes the decompressor 400 to begin retrieving video data from the RAM 900 in the reverse order that the data was written, and causes the video encoder 500 to convert the stored video signals in bank C and bank B to be outputted as a composite video signal. During this second reproducing operation, when reading. of the video data stored in the bank B begins, the controller 700 cause operation in the assemble and reproducing modes to repeat.

However, in this reproducing mode, the video signals of only 100 frames are reproduced and sequentially stored in banks A and C in the switching mode while the reading of video data from the bank B completes. As with the previous reproducing mode, reproduction and storage of video signals in banks A and C completes at the same time reading of video data from bank B completes. Reading of data from banks C and A then commences, and the cycle begins again. Namely, data will be alternately written to and read from (1) banks A and B and (2) banks A and C.

Since the reading and writing operations are conducted in separate memory space, the reading and the writing addresses never conflict in backward reproducing even though the reading of stored video data and the storing of newly reproduced video signals are conducted simultaneously.

The present invention provides a method for allocating memory and using the allocated memory space differently according to each of recording, forward reproducing and backward reproducing. This method enables the retrieval of stored video data and the storing of new video data to be conducted simultaneously without address conflicts. The method reduces delay time, and prevents the deck 820 from being overloaded. Furthermore, because of the switching operation, a single port RAM 900 is used to store the video data. A single port RAM 900 costs significantly less than a dual port RAM 900 or multiple dual port memories and a frame memories.

The present invention has been described with reference to a particular embodiment in connection with a particular application. Those having ordinary skill in the art and access to the teachings of the present invention will recognize additional modifications and applications are within the scope of the present invention. It is therefore intended by the appended claims to cover any and all such applications, modifications, and embodiments within the scope of the present invention.

What is claimed is:

1. A method for recording video data on a recording medium, comprising:
    a) writing video data at a periodic time interval into a first bank of a single port memory;
    (b) reading said video data between points in time when said step a) writes said video data from a second bank of said single port memory such that said reading does not interfere with said writing; and
    (c) recording said video data on a recording medium.

2. The method of claim 1, further comprising:
    d) positioning said recording medium with respect to a recording element of a video data recording apparatus so that said recording element is positioned at a next position of said recording medium to record said video data; and wherein
        said step c) records said read video data beginning at said next position.

3. The method of claim 2, wherein said step d) moves said recording medium such that said recording medium attains a normal speed for having video data recorded thereon by a time that said recording element is positioned at said next position.

4. The method of claim 2, further comprising:
    e) storing a new next position when said step c) completes said recording based on a current position of said recording element with respect to said recording medium.

5. The method of claim 1, wherein said periodic interval depends on a recording time entered by a user.

6. A method for reproducing video data from a recording medium, comprising:
    a) reproducing said video data from said recording medium;
    b) writing said reproduced video data in a single port memory;
    c) reading said reproduced video data from said single port memory such that said writing does not interfere with said reading, wherein:
        said single port memory includes a first, second, and third bank;
        said step c) reads said reproduced video data from said first bank and said third bank of said single port memory; and
        said step b) writes said reproduced video data to said first bank and said second bank after said step c) reads said reproduced video data from said first bank and while said step c) is reading said reproduced video data from said third bank.

7. The method of claim 6, wherein said step c) reads said reproduced video data at a periodic time interval, and said step b) writes said reproduced video data between points in time when said step c) reads said reproduced video data.

8. The method of claim 6, wherein
    said step c) reads said reproduced video data at a periodic time interval; and
    said step b) writes said reproduced video data between points in time when said step c) reads said reproduced video data.

9. The method of claim 6, further comprising:
    d) positioning said recording medium with respect to a reproducing element of a video data reproducing apparatus so that said reproducing element is positioned at a next position of said reproducing medium to reproduce said reproduced video data; and wherein
        said step a) reproduces said read video data beginning at said next position.

10. The method of claim 9, wherein said step d) moves said recording medium such that said recording medium attains a normal speed for having video data reproduced therefrom by a time that said reproducing element is positioned at said next position.

11. The method of claim 9, further comprising:
    e) storing a new next position when said step c) completes said reproduction based on a current position of said reproducing element with respect to said recording medium.

12. The method of claim 6, wherein said step c) intermittently reads said reproduced video data from said single port memory at a periodic interval which depends on a recording time entered by a user.

13. A method for reproducing video data from a recording medium, comprising:
    a) reproducing said video data from said recording medium;
    b) writing said reproduced video data in a single port memory;
    c) reading said reproduced video data from said single port memory such that said writing does not interfere with said reading, wherein:
        said single port memory includes a first, second, and third bank;
        said step c) reads said reproduced video data from said third bank and said first bank of said single port memory and said step c) reads said reproduced video data in an order opposite to an order in which said step b) wrote said reproduced video data; and
        said step b) writes said reproduced video data to said second bank and said third bank after said step c)

reads said reproduced video data from said third bank and is reading said reproduced video data from said first bank.

14. A method for reproducing video data from a recording medium, comprising:
   a) reproducing said video data from said recording medium;
   b) writing said reproduced video data from in a memory; and
   c) reading said reproduced video data from said memory at a periodic interval,
   wherein said step b) writes said reproduced video data in said memory between points in time when said step c) reads said reproduced video data, and wherein:
      said memory includes a first, second, and third bank;
      said step c) reads said reproduced video data from said first bank and said third bank of said memory; and
      said step b) writes said reproduced video data to said first bank and said second bank after said step c) reads said reproduced video data from said first bank and while said step c) is reading said reproduced video data from said third bank.

15. The method of claim 14, wherein said step c) intermittently reads said reproduced video data from said single port memory at a periodic interval which depends on a recording time entered by a user.

16. A method for reproducing video data from a recording medium, comprising:
   a) reproducing said video data from said recording medium;
   b) writing said reproduced video data in a memory; and
   c) reading said reproduced video data from said memory at a periodic interval,
   wherein said step b) writes said reproduced video data in said memory between points in time when said step c) reads said reproduced video data, wherein:
      said memory includes a first, second, and third bank;
      said step c) reads said reproduced video data from said third and first bank of said memory and said step c) reads said reproduced video data in an order opposite to an order in which said step b) wrote said reproduced video data; and
      said step b) writes said reproduced video data to said second and third bank after said step c) reads said reproduced video data from said third bank and while said step c) is reading said reproduced video data from said first bank.

17. An apparatus for recording video data on a recording medium, comprising:
   a memory having a first bank and a second bank;
   a controller controlling writing of video data into said first bank of said memory such that said video data is written at a periodic interval, and controlling reading of said video data from said second bank of said memory such that said video data is read between points in time when said video data is written; and
   recording means for recording said read video data on said recording medium.

18. An apparatus for reproducing video data from a recording medium, comprising:
   means for reproducing said video data from said recording medium;
   a single port memory including a first, second, and third bank;
   a controller controlling writing of said reproduced video data to said first and second banks of said single port memory, and controlling reading of said reproduced video data from said first and third banks of said single port memory such that said writing does not interfere with said reading.

19. The apparatus of claim 18, wherein said controller controls reading of said reproduced video data such that said reproduced video data is read in an order opposite to an order in which said reproduced video data was written.

20. An apparatus for reproducing video data from a recording medium, comprising:
   means for reproducing said video data from said recording medium;
   a memory including a first, second, and third bank;
   a controller controlling writing of said reproduced video data to said first and second banks of said memory, and reading of said reproduced video data from said first and third banks of said memory such that said reproduced video data is read at a periodic interval and written between points in time when said reproduced video data is read.

21. The apparatus of claim 20, wherein said controller controls reading of said reproduced video data such that said reproduced video data is read in an order opposite to an order in which said reproduced video data was written.

* * * * *